US012771873B2

(12) United States Patent
Chupeau et al.

(10) Patent No.: US 12,771,873 B2
(45) Date of Patent: Oct. 20, 2026

(54) DECODER SIDE DEPTH AND COLOR ALIGNMENT WITH THE ASSISTANCE OF METADATA FOR THE TRANSCODING OF VOLUMETRIC VIDEO

(71) Applicant: InterDigital CE Patent Holdings, SAS, Paris (FR)

(72) Inventors: Bertrand Chupeau, Rennes (FR); Franck Thudor, Rennes (FR); Remy Gendrot, Montgermont (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 0 days.

(21) Appl. No.: 18/868,297

(22) PCT Filed: May 23, 2023

(86) PCT No.: PCT/EP2023/063749
§ 371 (c)(1),
(2) Date: Nov. 22, 2024

(87) PCT Pub. No.: WO2023/227582
PCT Pub. Date: Nov. 30, 2023

(65) Prior Publication Data

US 2026/0012639 A1 Jan. 8, 2026

(30) Foreign Application Priority Data

May 24, 2022 (EP) .................................... 22305767

(51) Int. Cl.

| | |
|---|---|
| ***H04N 19/597*** | (2014.01) |
| ***G06T 15/00*** | (2011.01) |
| ***H04N 13/271*** | (2018.01) |

(52) U.S. Cl.
CPC ......... *H04N 19/597* (2014.11); *G06T 15/005* (2013.01); *H04N 13/271* (2018.05)

(58) Field of Classification Search
CPC ............... H04N 19/597; H04N 13/271; H04N 2013/0092; H04N 2213/003;
(Continued)

(56) References Cited

U.S. PATENT DOCUMENTS 10,424,083 B2 * 9/2019 Sinharoy ................ G06T 15/04
11,790,562 B2 * 10/2023 Fleureau .............. G06T 15/205
382/232

(Continued)

FOREIGN PATENT DOCUMENTS

CN 107154014 B * 6/2020 .......... G06T 3/4038
CN 108335328 B * 9/2021

(Continued)

OTHER PUBLICATIONS

"Use cases and requirements for MIV—edition-2 (final)", International Organisation for Standardisation, ISO/IEC JTC 1/SC 29/WG 2, MPEG Technical requirements, Document: N0157, Online, Jan. 2022, 7 pages.

(Continued)

*Primary Examiner* — Stefan Gadomski
(74) *Attorney, Agent, or Firm* — Flaster Greenberg P.C.

(57) ABSTRACT

Methods, device and data stream are provided to encode unaligned multi-view plus depth images associated with assistance metadata for generating depth maps aligned with the unaligned color views. At the encoding stage, for an unaligned color view, the contribution of each depth map is evaluated, and the objects represented are mapped. Picture patches are cut to be homogeneous in terms of objects and contributing views. Metadata describing this homogeneous cut are encoded together with the atlas. At the decoding stage, to generate a depth map aligned with the unaligned color view, only the depth maps referenced in the assistance metadata are warped.

8 Claims, 4 Drawing Sheets

(58) Field of Classification Search
CPC .... H04N 13/161; H04N 13/282; H04N 19/70; G06T 15/005; G06T 15/405; G06T 17/00
See application file for complete search history.

(56) References Cited

U.S. PATENT DOCUMENTS

| | | | | |
|---|---|---|---|---|
| 11,861,788 | B1 * | 1/2024 | Taghavi Nasrabadi | G06T 15/08 |
| 12,256,098 | B1 * | 3/2025 | Mammou | H04N 19/597 |
| 2014/0092439 | A1 * | 4/2014 | Krig | H04N 13/161 348/43 |
| 2015/0269739 | A1 * | 9/2015 | Ho | G06T 7/285 382/164 |
| 2018/0232859 | A1 * | 8/2018 | Siddiqui | G06T 7/90 |
| 2020/0045292 | A1 * | 2/2020 | Boyce | H04N 13/178 |
| 2020/0344493 | A1 * | 10/2020 | Fleureau | H04N 13/178 |
| 2021/0006834 | A1 * | 1/2021 | Salahieh | H04N 19/597 |
| 2021/0067757 | A1 * | 3/2021 | Yun | H04N 13/282 |
| 2021/0074025 | A1 * | 3/2021 | Fleureau | G06T 7/50 |
| 2021/0074029 | A1 * | 3/2021 | Fleureau | G06T 15/205 |
| 2021/0187741 | A1 * | 6/2021 | Marthi | B25J 9/1676 |
| 2021/0272323 | A1 * | 9/2021 | Ricard | H04N 19/597 |
| 2021/0383590 | A1 * | 12/2021 | Roimela | H04N 19/597 |
| 2022/0019852 | A1 * | 1/2022 | Eyjolfsdottir | G06N 3/045 |
| 2022/0138990 | A1 * | 5/2022 | Fleureau | G06T 9/001 382/232 |
| 2022/0264150 | A1 * | 8/2022 | Fleureau | H04N 19/70 |
| 2022/0343549 | A1 * | 10/2022 | Chupeau | G06T 9/001 |
| 2022/0345756 | A1 * | 10/2022 | Kroon | H04N 21/234363 |
| 2023/0239451 | A1 * | 7/2023 | Fleureau | H04N 13/161 348/43 |
| 2023/0247222 | A1 * | 8/2023 | Boyce | G06V 10/764 375/240.12 |
| 2024/0195947 | A1 * | 6/2024 | Lim | H04N 19/85 |
| 2024/0196011 | A1 * | 6/2024 | Drazic | H04N 21/234327 |
| 2024/0244259 | A1 * | 7/2024 | Doyen | G03H 1/08 |
| 2024/0249462 | A1 * | 7/2024 | Chupeau | G06T 15/06 |

FOREIGN PATENT DOCUMENTS

| | | | | |
|---|---|---|---|---|
| EP | 2316109 B1 * | 12/2017 | H04N 13/00 |
| EP | 2898689 B1 | 5/2020 | |
| KR | 20190105011 A * | 9/2019 | G06T 7/90 |
| WO | WO-2021176133 A1 * | 9/2021 | H04N 19/70 |
| WO | WO 2023194109 A1 | 10/2023 | |

OTHER PUBLICATIONS

Gross et al., "Point-Based Graphics", San Francisco, CA, USA: Morgan Kaufmann, 2007, 58 pages.
Boyce et al., "[MIV] New work areas for MIV v2", International Organisation for Standardisation, ISO/IEC JTC 1/SC 29/WG 4, Document: m58560-d2, Jan. 2022, 3 pages.
Xu et al., "Depth map misalignment correction and dilation for DIBR view synthesis", Signal Processing: Image Communication 28, 2013, 23 pages.
Information Technology—Coded Representation of Immersive Media—Part 5: Visual Volumetric Video-based Coding (V3C) and Video-based Point Cloud Compression (V-PCC), International Organization of Standardization (ISO) and International Electrotechnical Commission (IEC), FDIS Stage, ISO/IEC JTC 1/SC 29/WG 11, ISO/IEC 23090-5:2020 (E), 2020, 303 pages.
Cochran et al., "Object Maps for Technicolor Museum Sequence", International Organisation for Standardisation, ISO/IEC JTC1/SC29/WG11, Coding of Moving Pictures and Audio, Document: MPEG2020/m52474, Brussels, Belgium, Jan. 2020, 4 pages.
"Call for MPEG Immersive Video test materials", International Organisation for Standardisation, ISO/IEC JTC 1/SC 29/WG 4, MPEG Video Coding, Document: N00170, Jan. 21, 2022, 9 pages.
"Preliminary WD1 of ISO/IEC 23090-12 MPEG Immersive Video Ed. 2", 137. MPEG Meeting; Jan. 17, 2022-Jan. 21, 2022; Online; (Motion Picture Expert Group or ISO/IEC JTC1/SC29/WVG11), Document: n21237 Feb. 17, 2022, 83 pages.
Salahieh et al., "Test Model 11 for MPEG Immersive video", International Organisation for Standardisation, ISO/IEC JTC 1/SC 29/WG 4, MPEG Video Coding, Document: N0142, Oct. 29, 2021, 53 pages.

* cited by examiner

DECODER SIDE DEPTH AND COLOR ALIGNMENT WITH THE ASSISTANCE OF METADATA FOR THE TRANSCODING OF VOLUMETRIC VIDEO

CROSS REFERENCE TO RELATED APPLICATIONS

This application is a U.S. National Stage Application under 35 U.S.C. § 371 of International Patent Application No. PCT/EP2023/063749, filed May 23, 2023, which is incorporated herein by reference in its entirety.

This application claims priority to European Application No. 22305767.0, filed May 24, 2022, which is incorporated herein by reference in its entirety.

1. TECHNICAL FIELD

The present principles generally relate to the domain of multi-view plus depth (MVD) content, in particular, the general principles relate to MVD content acquired by unaligned color and depth sensors. The present document is also understood in the context of the encoding and the formatting of metadata associated with encoded MVD content.

2. BACKGROUND

The present section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

Multi-view-plus-depth (MVD) images are acquired by a set of color and depth sensors located at different points of a 3D scene and oriented toward the 3D scene. A result of such an acquisition is a set of color views and depth views. Color and depth sensors may be aligned (i.e. depth sensors and color cameras have common focal points and capture a common frustrum) or they can be unaligned. The number of depth sensors may be different than the number of color cameras. As such a set of color images and depth views represent a big amount of data, it is usual to encode and compress MVD images according to methods that decrease the size of data. For example, encoding a MVD image as a pair of patch atlases is a technique allowing to remove redundant information between (color and/or depth) views and to compress the atlases with image or video compression methods. Unaligned MVD images are easier to capture and lighter to encode than aligned MVD images that require highly technical camera rigs, and that generate more depth maps.

MVD images are used, for example, to synthesize virtual views from viewpoints of the scene that do not correspond to one of the cameras' viewpoints. View synthesis requires depth maps warping and color blending operations. An encoded unaligned MVD image may also be converted into an aligned MVD image. This process consists in synthetizing a depth view (also called depth map) for each color view (also called color image or color map), that is processing a warping of every unaligned depth map for each color image. However, each depth map does not contribute to a view synthesis at the same level according to the location of the viewpoints of the sensors and the location of the view to synthetize. In addition, a volumetric scene captured as a MVD image may comprise identified objects that may be managed independently while synthesizing a virtual view (for instance, inserting a 3D object in a different background). Thus, there is a need for associating objects of interest of a color view with depth views contributing to the warping of its geometry when the MVD image is unaligned in order to decrease the complexity, computational burden and memory footprint of transcoding.

3. SUMMARY

The following presents a simplified summary of the present principles to provide a basic understanding of some aspects of the present principles. This summary is not an extensive overview of the present principles. It is not intended to identify key or critical elements of the present principles. The following summary merely presents some aspects of the present principles in a simplified form as a prelude to the more detailed description provided below.

The present principles relate to a method for encoding a 3D scene in a data stream. The method comprises obtaining a multi-view plus depth image comprising color pictures with color picture location information and depth pictures with depth picture location information, wherein at least one depth picture is non-collocated to at least a color picture. Then, for at least a color picture, generating a depth view assignment map. Color patch atlases and depth patch atlases are generated. For both of them, a patch being a part of a unique color picture or of a unique depth picture selected according to the depth view assignment map. The color patch atlases, the depth patch atlases and metadata comprising, per color patch, an information indicating which depth patch to use for un-projecting the color patch are encoded in the data stream. In an embodiment, for the at least a color picture, an object map is generated, and color patches and depth patches are generated to belong to a unique object according to the object map. In another embodiment, the metadata comprise an information indicating whether a given depth patch has to be selected to un-project at least a color patch.

The present principles also relate to a device comprising a memory associated with a processor configured for implementing the method above.

The present principles also relate to a method for rendering a 3D scene from a data stream. The method comprises decoding, from the data stream, color patch atlases, depth patch atlases and metadata comprising, per color patch, an information indicating which depth patch to use for un-projecting the color patch. The 3D scene is rendered by un-projecting color patches according to corresponding depth patches.

The present principles also relate to a device comprising a memory associated with a processor configured for implementing the method above.

4. BRIEF DESCRIPTION OF DRAWINGS

The present disclosure will be better understood, and other specific features and advantages will emerge upon reading the following description, the description making reference to the annexed drawings wherein.

5. DETAILED DESCRIPTION OF EMBODIMENTS

Figure 1:
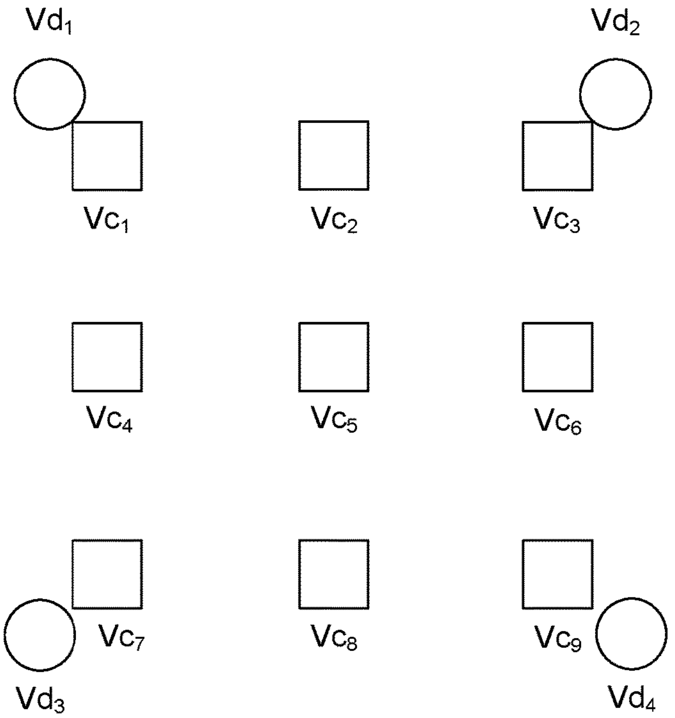
FIG. 1 shows an example camera array layout comprising four depth sensors placed around a three-by-three color camera rig.

The present principles will be described more fully hereinafter with reference to the accompanying figures, in which examples of the present principles are shown. The present principles may, however, be embodied in many alternate forms and should not be construed as limited to the examples set forth herein. Accordingly, while the present principles are susceptible to various modifications and alternative forms, specific examples thereof are shown by way of examples in the drawings and will herein be described in detail. It should be understood, however, that there is no intent to limit the present principles to the particular forms disclosed, but on the contrary, the disclosure is to cover all modifications, equivalents, and alternatives falling within the spirit and scope of the present principles as defined by the claims.

The terminology used herein is for the purpose of describing particular examples only and is not intended to be limiting of the present principles. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the present principles.

Although some of the diagrams include arrows on communication paths to show a primary direction of communication, it is to be understood that communication may occur in the opposite direction to the depicted arrows.

Some examples are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "in accordance with an example" or "in an example" means that a particular feature, structure, or characteristic described in connection with the example can be included in at least one implementation of the present principles. The appearances of the phrase in accordance with an example" or "in an example" in various places in the specification are not necessarily all referring to the same example, nor are separate or alternative examples necessarily mutually exclusive of other examples.

Reference numerals appearing in the claims are by way of illustration only and shall have no limiting effect on the scope of the claims. While not explicitly described, the present examples and variants may be employed in any combination or sub-combination.

FIG. 1 shows an example camera array layout comprising four depth sensors $Vd_1$ to $Vd_4$ placed around a three-by-three color camera rig. The present principles are valid for any other arbitrary number and relative positions of color and depth sensors. In the example of FIG. 1, color cameras $Vc_1$ to $Vc_9$ are not aligned with depth sensors $Vd_1$ to $Vd_4$. In the example of FIG. 1, the number of depth sensors is lower than the number of color cameras. FIG. 1 diagrammatically shows the location and the orientation of a set color cameras, each of them capturing a color view, and of a set of depth sensors, each of them capturing a depth view. Each color or depth sensor may have a different orientation, even, in practice, it is more convenient to organize them as a rig pointing in a unique direction. In different embodiments, the rig has a spherical shape and sensors (depth and color) point in every direction.

Figure 2A:
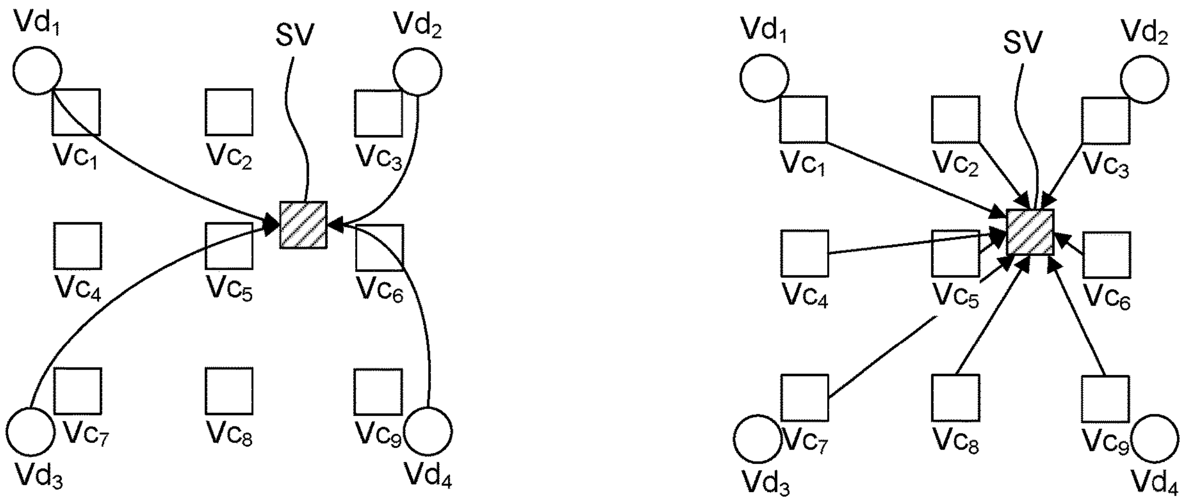
FIG. 2A illustrates the contribution of depth maps and color images captured by sensors of FIG. 1 to a synthetized view.

FIG. 2A illustrates the contribution of depth maps and color images captured by sensors of FIG. 1 to a synthetized view SV. To synthesize virtual view SV, the renderer inverse-projects the (u,v) pixels of each decoded depth view to their (x,y,z) 3D position and re-projects the corresponding color attributes of the color views of the corresponding pixel coordinates (u',v') in the virtual viewport frame of reference (that is the pixel array of the view to be synthetized). Such an inverse projection plus re-projection process is not straightforward when depth views are not aligned with color views. Indeed, the color value of a point (x, y, z) (obtained from the inverse-projection of a pixel of at least one depth view) does not directly correspond to a pixel of a color view. Existing view rendering algorithms use a two-stage visibility and shading approach. The viewport depth view (also called visibility map) is first generated by warping all the depth views from the MVD image to the viewport, selecting the best depth candidate for each pixel and filtering the resulting viewport depth view. Then the color of the viewport is generated by blending the colors of the source views, according to the visibility map. Such a two-stage approach for view rendering does not require that depth views and color source views are spatially aligned. However, blending colors on an unaligned visibility map is a process more complex than blending colors on an aligned visibility map.

In some use cases, the MVD source has to be re-generated at decoder side and transcoded to a MVD signal with aligned color and depth views. Such transcoding can be required, for example, when an autostereoscopic multi-view display is used. The generation of aligned MVD images may also be required when transcoding is required, for example, when a MIV (MPEG Immersive Video) signal transcoding to another 3D compression formats that assume spatially aligned color and depth components, such as 3D-HEVC (High Efficiency Video Coding) must be performed. The generation of depth maps aligned with the decoded color views involve similar depth warping, selecting, and filtering operations as in the visibility stage of a rendering algorithm. However, as not a single viewport depth view is to be computed (but the depth views corresponding to every source color view), the computational demand increases proportionally to the number of color cameras.

Figure 2B:
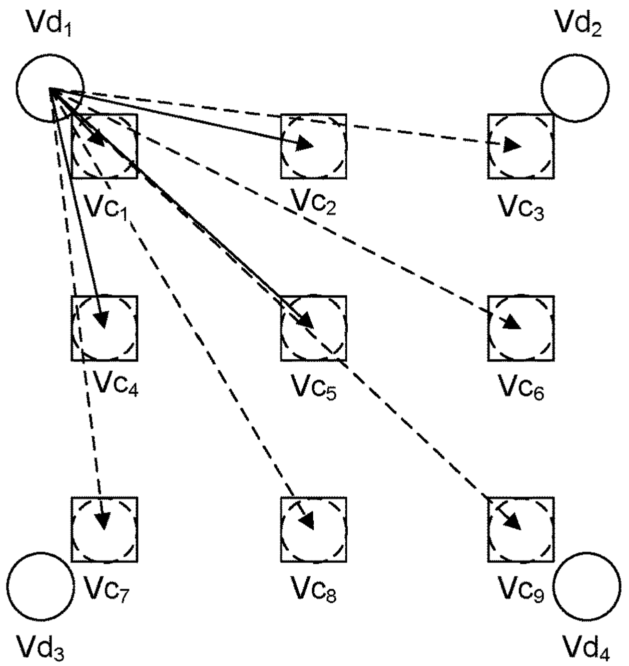
FIG. 2B illustrates the potential contribution of a depth map of FIG. 1, to the depth maps associated with the nine color views.

FIG. 2B illustrates the potential contribution of the depth views from upper-left depth sensor (Vd1), to the depth views associated with the nine color views. Upper-left depth sensor Vd1 may contribute mostly to the four nearby color views ($Vc_1$, $Vc_2$, $Vc_4$, $Vc_5$) rather than to the five further ones, and the number of depth warping operations may be reduced to the closest color views. Operations may be more complex according to the 3D geometry of the captured scene and the positions and orientations of the depth sensors.

Figure 5:
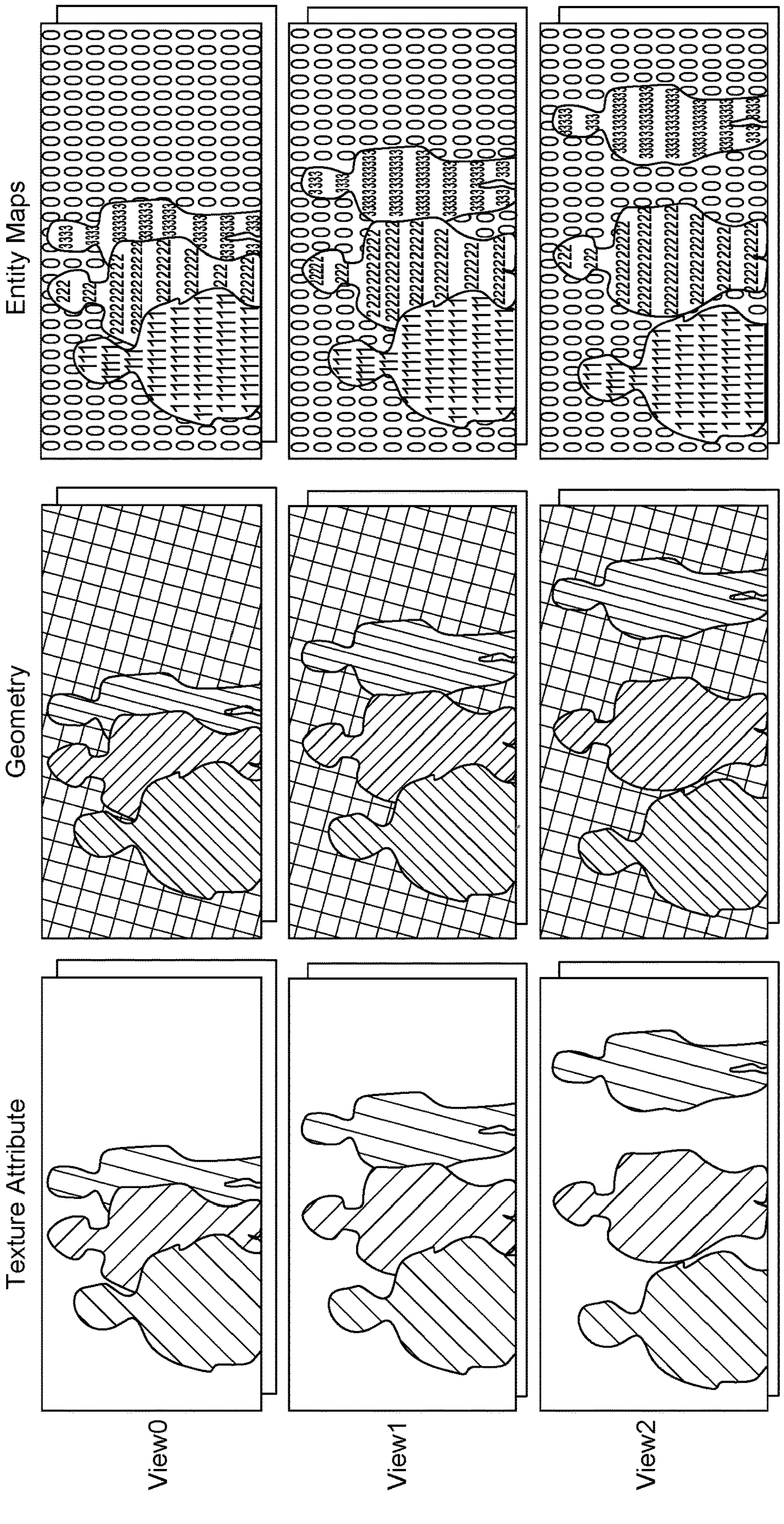
FIG. 5 illustrates an example of a MVD scene segmented into four objects inputted in an encoder according to the present principles.

FIG. 5 illustrates an example of a MVD scene segmented into four objects (the background and three foreground characters), which is inputted in an encoder according to the present principles with segmentation masks (also called entity maps) related to each source view. In a patch atlas representation (not represented in the figures, e.g. like in the MIV standard) of the 3D scene, each patch may be assigned to a unique entity ID at the encoder side and, at the decoder side, a possible filtering of a group of objects may be enabled, for example, for partial reconstruction. For instance, in the example of FIG. 5, the background entity may be discarded, and the three characters rendered for a composition with a different background. According to the present principles, for applications that requires a transcoding of the decoded unaligned color and depth views to a color-depth spatially aligned representation on a given subset of objects only and not on the entire scene, metadata to assist the alignment process are provided at an object level.

Figure 6:
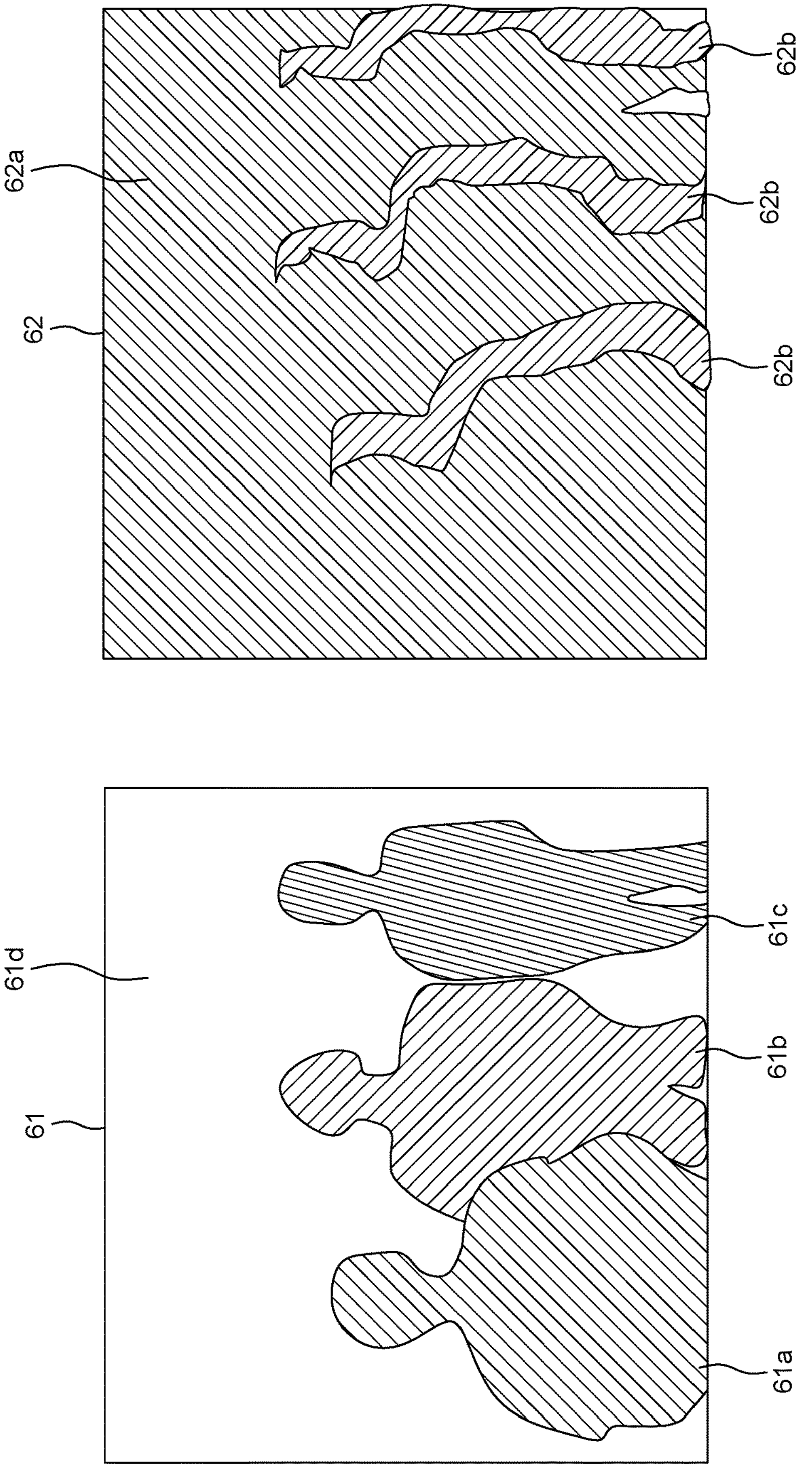
FIG. 6 illustrates a method to prepare metadata to assist the alignment process of an unaligned MVD image according to the present principles.

FIG. 6 illustrates a method to prepare metadata to assist the alignment process of an unaligned MVD image according to the present principles. At a first step, for each color view, an object map and a depth view assignment map are generated. FIG. 6 shows an object map 61 and a depth view assignment map 62 prepared for color view 0 of FIG. 5. For each pixel of the color view, the object map identifies the object that the color pixel belongs to. For each pixel of the color view, the depth view assignment map identifies which depth view the assigned depth value is warped from. In FIG. 6, object map 61 identifies four objects 61*a* to 61*d* corresponding to the three characters and to the background and depth view assignment map 62 identifies two depth views 62*a* and 62*b* contributing to the generation of a new depth map aligned with the color view. In the example of FIG. 6, most of the depth values are warped from depth view 62*a*, for instance, captured by the closest depth sensor. Because the depth sensor is not aligned with the color camera, some areas are occluded and are warped from a second depth view 62*b* captured by a different depth sensor.

The following algorithm may be used to calculate a depth view assignment map:

```
for each target color view
  initialize to 0 a depth view assignment map A[v][u] and optionally two coordinate maps
  Ax[v][u] and Ay[v][u]
  for each source depth view D[j][y][x]
      generate a depth map D̃[j][v][u] warped to the target view
        unproject/reproject pixels towards the target view
        splat-based rasterization or triangulation
      optionally memorize the original coordinates (x, y) in the source depth view of the
      warped depth samples at positions (u, v): X[j][v][u] = x and Y[j][v][u] = y
  for each pixel (u, v) of the target view
      select the warped depth map D̃[j_select] which gives the final target depth value
      D̃[j_select][v][u] (e.g. majority voting process taking into account the weight of
      each source depth view with respect to the target view, which depends on their
      distance)
      set A[v][u] = j_select
    optionally set Ax[v][u] = X[j_select][v][u] and Ay[v][u] = Y[j_select][v][u]
```

At a second step of the method illustrated by FIG. 6, patches are cut to prepare patch atlases. Each color view can then be cut into patches which are homogeneous in terms of object and also in terms of source depth view, that is with a single object TD and a single depth view index per patch. These homogeneous patches are packed into a color atlas frame associated with a binary occupancy atlas frame, to indicate which pixels of the patches are valid, i.e. belong to the object.

As an option, when defining the color patches, the bounding box which contains all the depth samples necessary for warping the depth to the current patch in the attached depth view can be straightforwardly determined by computing the minimum and maximum values of Ax[v][u] and Ay[v][u] for the current patch.

At a third step of the method, metadata to assist the alignment process of the unaligned MVD image are prepared and encoded with the atlas. A syntax for these metadata may be based the MIV syntax as described below. It is first signalled in the sequence parameter set of each atlas whether patch depth warping assistance data is available. This depth warping assistance data only applies to atlases which do not have geometry component (that is aligned depth patch). The underlying assumption is that, at encoding stage, patches from color-only views and patches from depth-only views are packed in separate atlases.

| | Descriptor |
|---|---|
| asps_miv_extension( ) { | |
| asme_ancillary_atlas_flag | u(1) |
| asme_embedded_occupancy_enabled_flag | u(1) |
| if( asme_embedded_occupancy_enabled_flag ) | |
| asme_depth_occ_threshold_flag | u(1) |
| asme_geometry_scale_enabled_flag | u(1) |
| if( asme_geometry_scale_enabled_flag ) { | |
| asme_geometry_scale_factor_x_minus1 | ue(v) |
| asme_geometry_scale_factor_y_minus1 | ue(v) |
| } | |
| if( !asme_embedded_occupancy_enabled_flag ) | |
| asme_occupancy_scale_enabled_flag | u(1) |
| if( !asme_embedded_occupancy_enabled_flag && asme_occupancy_scale_enabled_flag ) { | |
| asme_occupancy_scale_factor_x_minus1 | ue(v) |
| asme_occupancy_scale_factor_y_minus1 | ue(v) |
| } | |
| asme_patch_constant_depth_flag | u(1) |
| asme_patch_texture_offset_enabled_flag | u(1) |
| if( asme_patch_texture_offset_enabled_flag ) | |
| asme_patch_texture_offset_bit_depth_minus1 | ue(v) |
| asme_max_entity_id | ue(v) |
| asme_inpaint_enabled_flag | u(1) |
| asme_depth_warping_assistance_flag | u(1) |
| } | |

asme_depth_warping_assistance_flag equal to 1 indicates that the pdu_depth_warping_present_flag [tileID] [p] syntax element is present in the pdu_miv_extension( ) syntax structure. asme_depth_warping_assistance_flag equal to 0 indicates that the pdu_depth_warping_present_flag [tileID] [p] syntax element is not present in the pdu_miv_extension( ) syntax structure. When not present, the value of asme_depth_warping_assistance_flag is inferred to be equal to 0.

When asme_patch_constant_depth_flag equal to 1 or vps_geometry_video_present_flag [aspsAtlasID] equal to 1 or pin_geometry_present_flag [aspsAtlasID] equal to 1, it is a requirement of bitstream conformance that asme_depth_warping_assistance_flag is equal to 0.

| | Descriptor |
|---|---|
| pdu_miv_extension( tileID, p ) { | |
| if( asme_max_entity_id > 0 ) | |
| pdu_entity_id[ tileID ][ p ] | u(v) |
| if( asme_depth_occ_threshold_flag ) | |
| pdu_depth_occ_threshold[ tileID ][ p ] | u(v) |
| if( asme_patch_texture_offset_enabled_flag ) | |
| for( c = 0; c < 3; c++ ) { | |
| pdu_texture_offset[ tileID ][ p ][ c ] | u(v) |
| if( asme_inpaint_enabled_flag ) | |
| pdu_inpaint_flag[ tileID ][ p ] | u(1) |
| if( asme_depth_warping_assistance_flag ) { | |
| pdu_depth_warping_present_flag | u(1) |
| if( pdu_warping_present_flag ) { | |
| pdu_depth_view_idx[ tileID ][ p ] | u(16) |
| pdu_depth_bounding_box_present_flag | u(1) |
| if( pdu_depth_bounding_box_present_flag ) { | |
| pdu_depth_bb_pos_x[ tileID ][ p ] | ue(v) |
| pdu_depth_bb_pos_y[ tileID ][ p ] | ue(v) |
| pdu_depth_bb_size_x[ tileID ][ p ] | ue(v) |
| pdu_depth_bb_size_y[ tileID ][ p ] | ue(v) |
| } | |
| } | |
| } | |
| } | |

pdu_depth_warping_present_flag[tileID][p] equal to 1 indicates that depth warping assistance data are present in the pdu_miv_extension(tileID, p) syntax structure. pdu_depth_warping_present_flag[tileID][p] equal to 0 indicates that depth warping assistance data are not present in the pdu_miv_extension(tileID, p) syntax structure.

pdu_depth_view_idx[tileID][p] specifies the index of the view with index k with a geometry component which contributes to the geometry of the patch with index p in the tile with tile ID equal to tileID. The value of pdu_depth_view_idx[tileID][p] shall be in the range of 0 to mvp_num_views_minus1, inclusive.

pdu_depth_bounding_box_present_flag[tileID][p] equal to 1 indicates that bounding box parameters for the depth samples which contribute to the geometry of the patch with index p in the tile with tile ID equal to tileID are present. pdu_depth_bounding_box_present_flag[tileID][p] equal to 0 indicates that bounding box parameters are not present.

pdu_depth_bb_pos_x[tileID][p] specifies the x-coordinate of the top-left corner of the depth bounding box in the view with index equal to pdu_depth_view_idx[tileID][p].

pdu_depth_bb_pos_y[tileID][p] specifies the y-coordinate of the top-left corner of the depth bounding box in the view with index equal to pdu_depth_view_idx[tileID][p].

pdu_depth_bb_size_x[tileID][p] specifies the width value of the depth bounding box in the view with index equal to pdu_depth_view_idx[tileID][p].

pdu_depth_bb_size_y[tileID][p] specifies the height value of the depth bounding box in the view with index equal to pdu_depth_view_idx[tileID][p].

A method for decoding patch atlases representing a 3D scene and comprising unaligned color and depth patches is provided according to the present principles. The depth component of the color patches corresponding to the objects of interest are computed using the visibility step of a view rendering algorithm, but fed only with the subset of decoded depth values in the bounding box of the depth view signalled by the metadata:

```
for each patch of the color-only atlases
  retrieve the patch object ID
    either from the pdu_entity_id syntax element
    or from the Patch information SEI message;
  if the patch object ID is equal to one of the target object IDs
    position the patch in the source color view
    retrieve the depth view index j from metadata
    retrieve the bounding box {xmin, xmax, ymin, ymax} from metadata
    warp the depth values within the bounding box of the decoded depth view
    D̂[j] to the current color patch
    clean out the warped depth map of the patch using a post median filtering
    to remove outliers.
```

Thus, the decoding method comprises three steps:

Decoding depth, color and occupancy patch atlas frames;

Unpacking source depth views and reconstruction of the color source views for the target object; and Generating a color-depth aligned MVD for the target object, by warping the decoded depth samples, guided by the metadata attached to the color patches.

Figure 3:
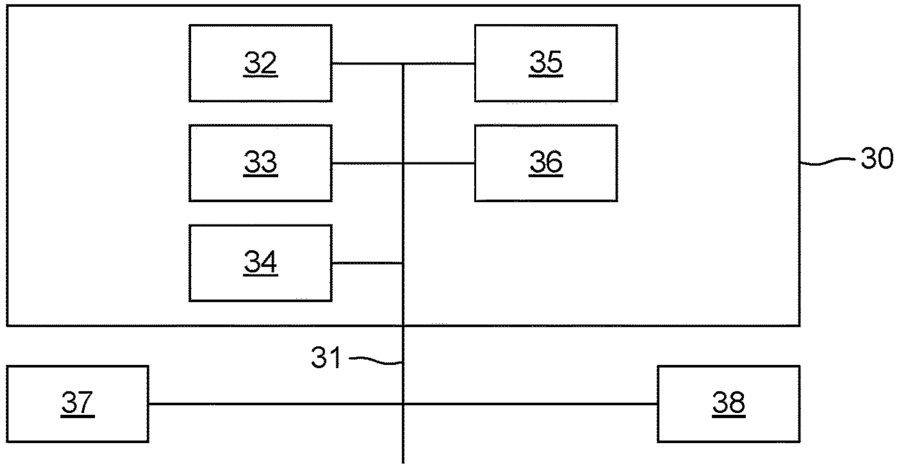
FIG. 3 shows an example architecture of a processing engine which may be configured to implement a method according to the present principles.

FIG. 3 shows an example architecture of a processing engine 30 which may be configured to implement the two methods described herein. A device according to the architecture of FIG. 3 is linked with other devices via their bus 31 and/or via I/O interface 36.

Device 30 comprises following elements that are linked together by a data and address bus 31:

a microprocessor 32 (or CPU), which is, for example, a DSP (or Digital Signal Processor);

a ROM (or Read Only Memory) 33;

a RAM (or Random Access Memory) 34;

a storage interface 35;

an I/O interface 36 for reception of data to transmit, from an application; and a power supply (not represented in FIG. 3), e.g. a battery.

In accordance with an example, the power supply is external to the device. In each of mentioned memory, the word <<register>> used in the specification may correspond to area of small capacity (some bits) or to very large area (e.g. a whole program or large amount of received or decoded data). The ROM 33 comprises at least a program and parameters. The ROM 33 may store algorithms and instructions to perform techniques in accordance with present principles. When switched on, the CPU 32 uploads the program in the RAM and executes the corresponding instructions.

The RAM 34 comprises, in a register, the program executed by the CPU 32 and uploaded after switch-on of the device 30, input data in a register, intermediate data in different states of the method in a register, and other variables used for the execution of the method in a register.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Device 30 is linked, for example via bus 31 to a set of sensors 37 and to a set of rendering devices 38. Sensors 37 may be, for example, cameras, microphones, temperature sensors, Inertial Measurement Units, GPS, hygrometry sensors, IR or UV light sensors or wind sensors. Rendering devices 38 may be, for example, displays, speakers, vibrators, heat, fan, etc.

In accordance with examples, the device 30 is configured to implement the two methods according to the present principles, and belongs to a set comprising:

a mobile device;

a communication device;

a game device;

a tablet (or tablet computer);

a laptop;

a still picture camera;

a video camera.

Figure 4:
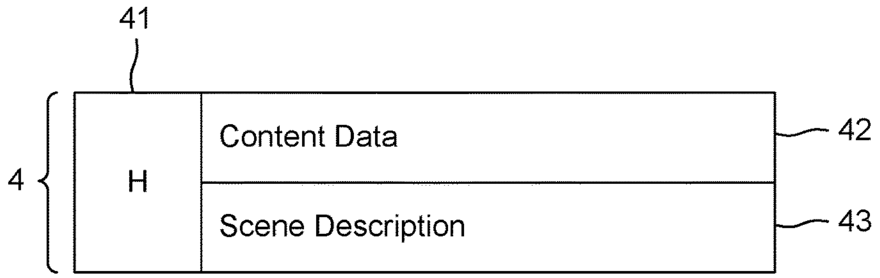
FIG. 4 shows an example of an embodiment of the syntax of a data stream encoding an unaligned MVD image or a sequence of unaligned MVD images according to the present principles.

FIG. 4 shows an example of an embodiment of the syntax of a data stream encoding an unaligned MVD image or a sequence of unaligned MVD images according to the present principles. The structure consists in a container which organizes the stream in independent elements of syntax. The structure may comprise a header part 41 which is a set of data common to every syntax element of the stream. For example, the header part comprises some of metadata about syntax elements, describing the nature and the role of each of them. The structure also comprises a payload comprising an element of syntax 42 and an element of syntax 43. Syntax element 42 comprises data representative of the unaligned MVD images, that is color views and depth maps (also called depth views). Images may have been compressed according to a compression method. Element of syntax 43 is a part of the payload of the data stream and comprises data encoding the assistance metadata as described according to the present principles. An item of the assistance metadata refers to an unaligned color view of a MVD image and comprises a subset of the depth views of the MVD image.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, Smartphones, tablets, computers, mobile phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, view generation, texture processing, and other processing of images and related texture information and/or depth information. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

What is claimed is:

1. A method for encoding a three-dimensional (3D) scene in a data stream, the method comprising:

obtaining a multi-view plus depth image comprising color pictures with color picture location information and depth pictures with depth picture location information, wherein at least one depth picture is non-collocated to at least a color picture;

for at least one color picture of the color pictures, generating a depth view assignment map;

generating color patch atlases and depth patch atlases, wherein a patch is a part of a color picture or of a depth picture according to the depth view assignment map; and encoding, in the data stream, the color patch atlases, the depth patch atlases and metadata comprising, per color patch, an information indicating which depth patch to use for un-projecting the color patch.

2. The method of claim 1, wherein, for the at least one color picture, an object map is generated and wherein color patches and depth patches are generated to belong to a unique object according to the object map.

3. The method of claim 1, wherein the metadata comprise information indicating whether a given depth patch has to be selected to un-project at least a color patch.

4. A device for encoding a three-dimensional (3D) scene in a data stream, the device comprising a processor configured for:

obtaining a multi-view plus depth image comprising color pictures with color picture location information and depth pictures with depth picture location information, wherein at least one depth picture is non-collocated to at least a color picture;

for at least one color picture of the color pictures, generating a depth view assignment map;

generating color patch atlases and depth patch atlases, wherein a patch is a part of a color picture or of a depth picture according to the depth view assignment map; and encoding, in the data stream, the color patch atlases, the depth patch atlases and metadata comprising, per color patch, an information indicating which depth patch to use for un-projecting the color patch.

5. The device of claim 4, wherein, for the at least one color picture, an object map is generated and wherein color patches and depth patches are generated to belong to a unique object according to the object map.

6. The device of claim 4, wherein the metadata comprise information indicating whether a given depth patch has to be selected to un-project at least a color patch.

7. A method for rendering a three-dimensional (3D) scene from a data stream, the method comprising:

decoding, from the data stream, color patch atlases, depth patch atlases and metadata comprising, for each color patch, an information indicating which depth patch to use for un-projecting the color patch; and rendering the 3D scene by un-projecting color patches according to corresponding depth patches.

8. A device for rendering a three-dimensional (3D) scene from a data stream, the device comprising a processor configured for:

decoding, from the data stream, color patch atlases, depth patch atlases and metadata comprising, for each color patch, an information indicating which depth patch to use for un-projecting the color patch; and rendering the 3D scene by un-projecting color patches according to corresponding depth patches.

* * * * *